United States Patent
Lebo et al.

(10) Patent No.: US 7,375,861 B2
(45) Date of Patent: May 20, 2008

(54) METHOD AND APPARATUS FOR PREVENTING PERSONS FROM LEAVING ORIGINAL DOCUMENTS IN A DOCUMENT COPIER

(75) Inventors: Levi Lebo, Vancouver, WA (US); Charles Michael Pickett, Brush Prairie, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1073 days.

(21) Appl. No.: 10/397,783

(22) Filed: Mar. 25, 2003

(65) Prior Publication Data

US 2004/0190078 A1    Sep. 30, 2004

(51) Int. Cl.
*H04N 1/04* (2006.01)
(52) U.S. Cl. .............. 358/474; 358/496; 358/497; 358/488
(58) Field of Classification Search .......... 358/474, 358/1.14, 496, 497, 488; 399/13–17; 340/522, 340/568.1, 673; 382/183
See application file for complete search history.

(56) References Cited

U.S. PATENT DOCUMENTS 4,399,431 A    8/1983    Satomi et al.
5,077,579 A *  12/1991   Shibusawa et al. ........... 399/17
5,563,958 A *  10/1996   Higgins et al. ............. 382/183

FOREIGN PATENT DOCUMENTS

JP    10207163 A    1/1997

* cited by examiner

*Primary Examiner*—Houshang Safaipour
(74) *Attorney, Agent, or Firm*—Madson & Austin

(57) ABSTRACT

A method and apparatus for preventing persons from leaving original documents in a document copier. A document is scanned by a document copier to produce a stored image thereof. Prior to producing any copies of the document, it is determined whether the document has been removed from the document copier. Producing any copies of the document is withheld unless it is determined that the document has been removed from the document copier. Alternatively, the stored image of the document may be examined to determine whether it includes selected information. If the stored image of the document includes the selected information, producing any copies of the document is withheld unless it is determined that the document has been removed from the document copier.

38 Claims, 3 Drawing Sheets

METHOD AND APPARATUS FOR PREVENTING PERSONS FROM LEAVING ORIGINAL DOCUMENTS IN A DOCUMENT COPIER

BACKGROUND OF THE INVENTION

In the use of photocopiers, it is a common problem that a person making copies will pick up the copies but leave behind in the photocopier the original document from which the copies were made. In a large organization, or a situation where the photocopier may be used by persons in unrelated organizations, this not only may result in the loss of a valuable original document, but it produces a security risk for information in the document as well. While this problem usually occurs when documents are placed on the platen of a photocopier sheet-by-sheet, rather than when an automatic document feeder ("ADF") is used, an original document may also be left in an ADF. In addition, this problem sometimes occurs in the-use of facsimile machines, which copy a document to a remote location. Both photocopiers and facsimile machines may be thought of as "document copiers."

A number of different approaches to preventing persons using a photocopier from leaving original documents in the photocopier are known which rely on the use of some type of device for detecting the presence of an original document in the photocopier. The photocopier may simply provide a display panel which instructs the user to remove the original when copying is complete and the presence of the original is detected. Another approach is to provide an audio or visual alarm when the power switch of the photocopier is turned off while the original is still present. Alternatively, if the original is still present for a predetermined period of time after a copy has been made, the photocopier may sound an alarm. Yet another known approach is to detect whether an original is present after copying and also to detect whether the user has moved out of a predetermined range of the photocopier, in which case an alarm is sounded.

However, none of these approaches is believed to be adequate, as it is always possible for a distracted user to remove copies from the photocopier and leave the original behind. Similarly, none of these approaches necessarily prevents a person from leaving an original document in a facsimile machine after the document has been transmitted.

SUMMARY OF THE INVENTION

The challenge of preventing original documents from being left in a document copier is met in the present inventions by scanning a document to produce a stored image thereof; determining, prior to producing any copies of the document, whether the document has been removed from the document copier; and withholding producing any copies of the document unless it is determined that the document has been removed from the document copier. Whether the original document has been removed may be determined directly by detecting whether a document is present on the platen of the photocopier or output tray of a facsimile machine, or indirectly by determining whether a photocopier platen cover has been lifted and closed. A visual or audible indication to a user of the document copier that scanning the document is complete may also be provided so that the user knows when to remove the original.

In one embodiment, the stored image of the document is examined to determine whether it includes selected information; if the stored image of the document includes the selected information, it is determined, prior to producing any copies of the document, whether the document has been removed from the document copier; and if the stored image of the document includes the selected information, producing any copies of the document is withheld unless it is determined that the document has been removed from the document copier. Preferably, the stored image is examined using character recognition analysis to determine whether certain symbols, key words or key phrases are on the document.

Various objectives, features and advantages of the invention will be more readily understood upon consideration of the following detailed description of the invention, taken in conjunction with the accompanying drawings.

DETAILED DESCRIPTION OF THE INVENTIONS

A contemporary photocopier typically comprises a platen for receiving an original document to be copied, a scanning mechanism for producing illumination light that scans the document while an image of the document is captured from the light reflected off the document, an array of detectors for capturing an optical image of the document as it is scanned and producing an electronic image thereof, and a digital memory for storing the electronic image. It further comprises some kind of printing mechanism that prints a paper or "hard" copy of the document from the stored electronic image. Typically, the printing mechanism is a so-called "laser printer" that writes the image onto a drum with an intensity modulated laser beam so as to produce a surface charge representative of the image, which attracts a print medium in accordance with the surface charge, and thereafter mechanically transfers the print medium from the drum to a sheet of paper, as is well understood in the art. However, other types of printing mechanisms may be used, such as ink jet printers in particular.

A photocopier typically includes a cover for placement over the document and platen while the document is being scanned. However, many photocopiers are equipped with an ADF that accepts multiple pages to be copied, feeds them into the photocopier without the need for a cover to be lifted, and places them on a return tray for the user to pick up.

A typical contemporary facsimile machine is fundamentally similar to a photocopier in that it scans a document, detects an image, stores an electronic image in a memory, and thereafter transmits the stored image to another facsimile machine which prints a copy of the document. Facsimile machines typically differ from photocopiers in that the document is scanned by moving the document past photodetectors, rather than moving the illumination source. Nevertheless, inventions described herein may be applied to facsimile machines as well as photocopiers. Accordingly, the term "document copier," as used herein, is intended to encompass facsimile machines and other similar apparatus as well as photocopiers, and references to producing copies are intended to encompass transmitting a stored electronic image to another location and printing it at that location.

Figure 1:
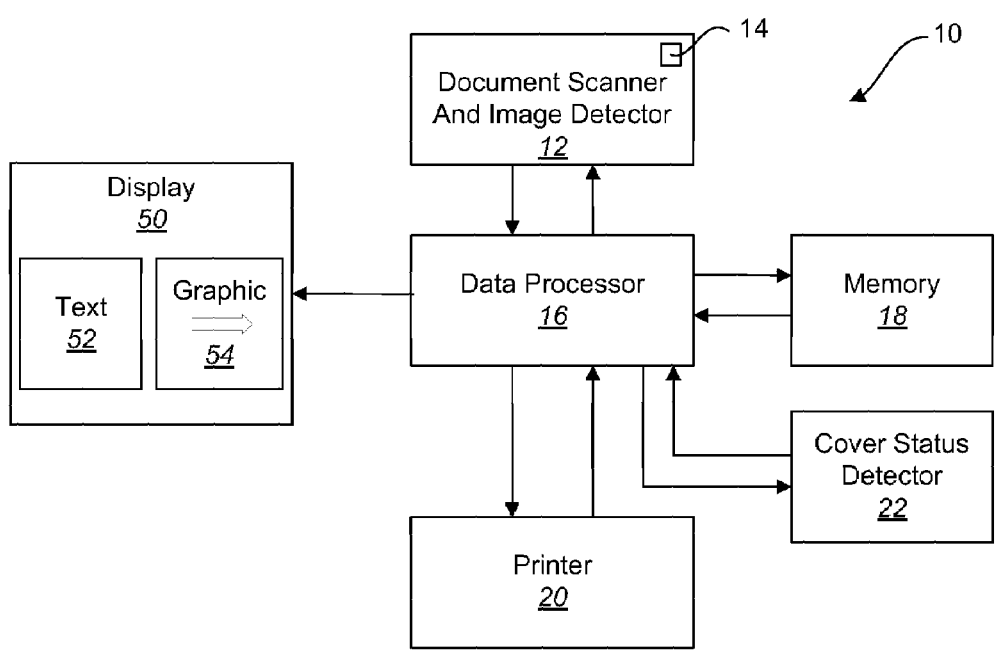
FIG. 1 is a block diagram of a photocopier including an apparatus for preventing persons from leaving original documents in a photocopier according to the present inventions.

FIG. 1 illustrates such a contemporary photocopier 10, adapted to include the present inventions. A document scanner and image detector 12 includes the platen for receiving an original document to be copied, a photoelectronic detector array, a scanning light source for illuminating the document, and an optical system for imaging the document onto the array, as is well understood in the art. The document scanner and image detector also includes a cover for the platen, and may include an ADF, as is also well understood in the art. The document scanner and image detector may also include a detector 14 for determining either whether a document is present on the platen, or in an ADF, as is well known in the art. Alternatively, the photocopier may rescan the platen one or more times to determine whether the original document is still present.

The document scanner and image detector 12 responds to control signals from a data processor 16 and sends document image data back to the data processor. The data processor 16 controls the operation of the photocopier, stores image data in a memory 18 and retrieves that data for analysis thereof. As is well understood in the art, the memory 18 also stores program instructions for both control operations of the data processor and for processing the image data.

The data processor 16 sends image data and control signals to a printer 20. The printer may be, for example, a laser printer or an ink jet printer, as is well understood in the art. In principle, the data processor could be programmed to send image data from the document scanner and image detector 12 directly to the printer 20, but the data is typically first stored in the memory then sent to the printer. In the case of the present inventions, the image data is stored in the memory before being sent to the printer.

For purposes of the present inventions, a photocopier may also include a cover status detector 22, which detects whether the platen cover has been opened or closed and provides that information to the data processor. The data processor may also be equipped to interrogate the cover status detector to determine whether it has been opened and closed.

The data processor 16 may also instruct a display 50 to produce a visual indication to a user. The indication may be a textual display 52 or a graphical display 54. The visual indication provided at the display 50 may indicate to the user the completion or non-completion of an event.

Figure 2:
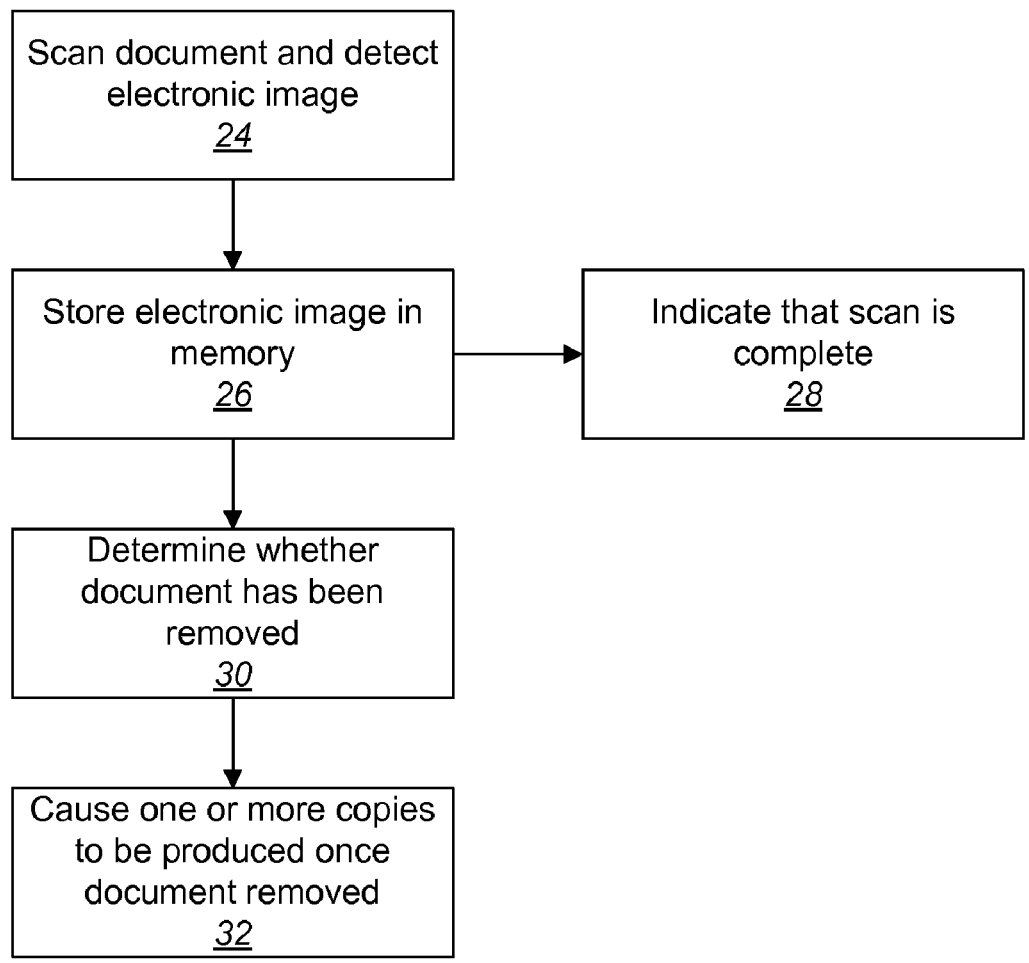
FIG. 2 is a flow chart of a first method for preventing persons from leaving original documents in a photocopier according to the present inventions.

Turning to FIG. 2, as well as FIG. 1, in one embodiment of the inventions the document scanner and image detector 12 first scans an original document and produces an electronic image in step 24. Then, in step 26, the electronic image is stored in the memory 18. Once the scanning and storage is complete, an indication that this is so is given in step 28, either by a visual display such as a textual or graphical message, or by an audio signal. This lets the user know that the original document may, and should, be removed from the photocopier.

In step 30, the data processor checks the detector 14 to determine whether a document is still present on the platen or ADF or, alternatively, checks the cover status detector 22 to determine whether, since the scan, the cover has been lifted and closed. If the cover has been lifted and closed, this is taken as an indication that the original document has been removed.

So far, nothing has occurred to cause any copies to be printed. However, in step 32, once the document has been determined, directly or indirectly, to have been removed, the data processor 16 causes one or more copies to be printed. On the other hand, no copies will be printed until the document photocopier has determined that the original document has been removed. Thus, it is virtually impossible for a user to take copies from the document copier and leave the original behind in the photocopier.

Figure 3:
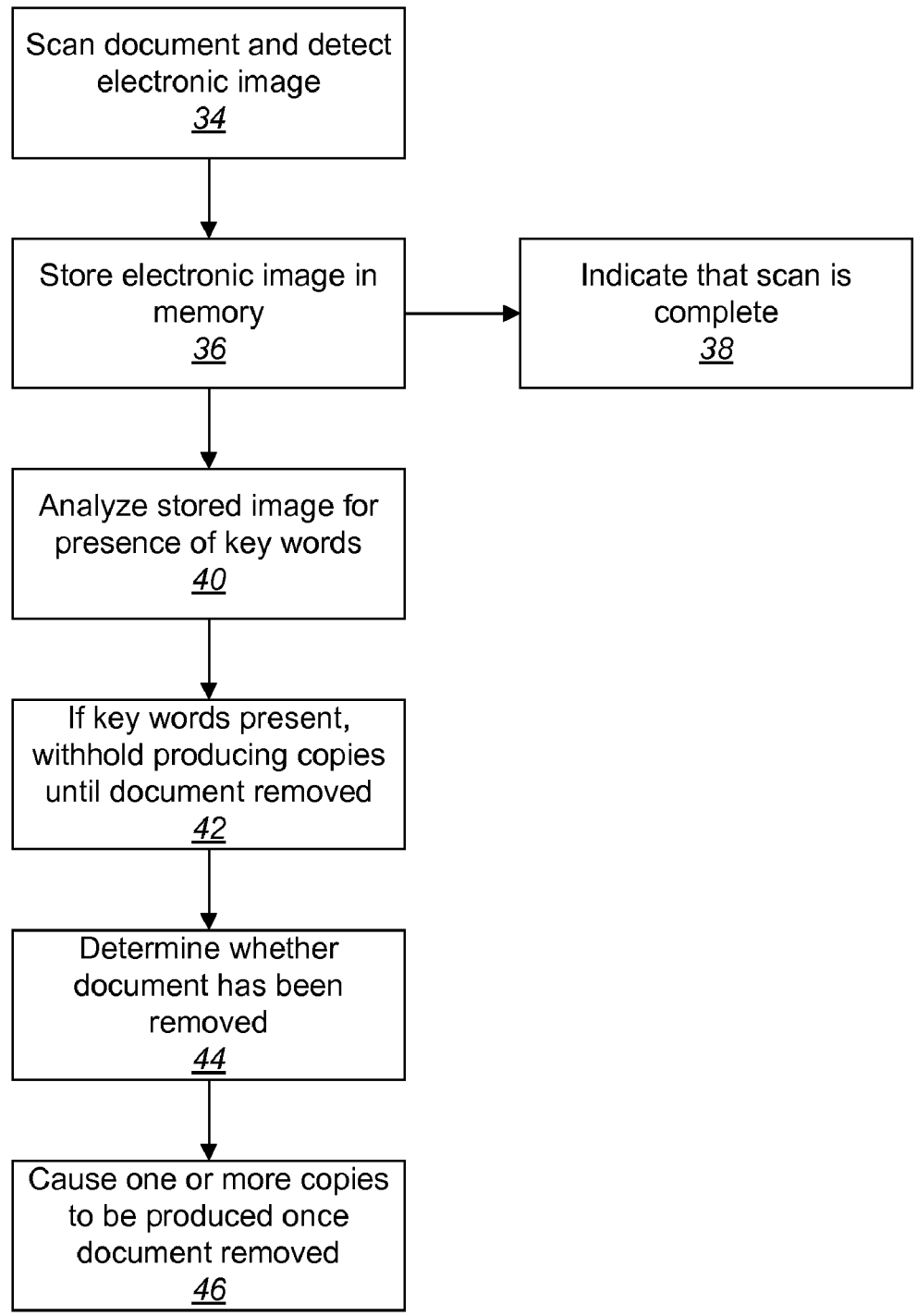
FIG. 3 is a flow chart of a second method for preventing persons from leaving original documents in a photocopier according to the present inventions.

An alternative embodiment is illustrated by the steps of FIG. 3. In this case, as in the embodiment of FIG. 2, the document is scanned and an electronic image thereof is stored in memory, and an indication is issued that the scan and storage is complete, in steps 34, 36 and 38, respectively. However, rather than withholding printing regardless of the content of the original document, the data processor analyzes the content of the document to determine whether certain information is present on the document and only withholds printing until the document is removed if that information is present. To that end, the memory 18 preferably includes character recognition software which is loaded into the data processor 16 and is used by the data processor to examine the electronic image for the presence of certain key symbols, characters, or combinations of characters such as words or phrases, as indicated in step 40. Key words or phrases may include, for example: "Confidential," "Company Private," "Company Confidential," "For Internal Use Only," and the like.

If the key characters or words are present, and the photocopier has determined that the original document has not been removed, then in step 42 the data processor withholds production of copies until the document is removed and preferably, also requests the user via a display panel to remove the original. Once, in step 44, it is determined that the document has been removed, the data processor causes one or more copies to be produced in step 46. Thus, documents which pose a particular security risk, for example, may be treated differently from other documents.

It is to be recognized that the inventions described herein may also be used in a facsimile machine, so that no copy is sent, and no confirmation copy is printed, until the original document is removed from the facsimile machine. To that end, the facsimile machine is equipped with a direct document detector analogous to detector 14, or an indirect document detector analogous to status detector 22.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow.

The invention claimed is:

1. A method for preventing original documents from being left in a document copier, comprising:
   scanning a document to produce a stored image thereof;
   determining, prior to producing any copies of the document, whether the document has been removed from the document copier; and
   withholding producing any copies of the document unless it is determined that the document has been removed from the document copier.

2. The method of claim 1, further comprising producing an indication to a user of the document copier that scanning the document is complete.

3. The method of claim 2, wherein said indication is a visual indication.

4. The method of claim 3, wherein said indication is a textual display.

5. The method of claim 3, wherein said indication is a graphical display.

6. The method of claim 2, wherein said indication is an audio signal.

7. The method of claim 1, wherein the document copier is a photocopier and said determining step comprises detecting whether a platen cover has been lifted and then lowered.

8. The method of claim 1, wherein said determining step comprises rescanning one or more times to determine whether the document is still present in the document copier.

9. The method of claim 1, wherein the document copier is a facsimile machine.

10. A method for preventing original documents from being left in a document copier, comprising:
scanning a document to produce a stored image thereof;
examining said stored image of said document to determine whether it includes selected information;
if said stored image of said document includes said selected information, determining, prior to producing any copies of the document, whether the document has been removed from the document copier; and
if said stored image of said document includes said selected information, withholding producing any copies of the document unless it is determined that the document has been removed form the document copier.

11. The method of claim 10, wherein said examining step comprises applying character recognition analysis to said stored image to determine whether certain key words are on the document.

12. The method of claim 10, further comprising producing an indication to a user of the document copier that scanning the document is complete.

13. The method of claim 12, wherein said indication is a visual indication.

14. The method of claim 13, wherein said indication is a textual display.

15. The method of claim 13, wherein said indication is a graphical display.

16. The method of claim 12, wherein said indication is an audio signal.

17. The method of claim 10, wherein the document copier is a photocopier and said determining step comprises detecting whether a platen cover has been lifted and then lowered.

18. The method of claim 10, wherein said determining step comprises rescanning one or more times to determine whether the document is still present in the document copier.

19. The method of claim 10, wherein the document copier is a facsimile machine.

20. An apparatus for preventing original documents from being left in a document copier, comprising:
a detection device for determining, prior to production of any copies of the document by the document copier, whether the document has been removed from the document copier; and
a control device, responsive to said detection device, for causing the document copier to withhold producing any copies of the document unless the detection device has determined that the document has been removed from the document copier.

21. The apparatus of claim 20, further comprising a signaling device for producing an indication to a user of the document copier that scanning the document is complete.

22. The apparatus of claim 21, wherein said indication is a visual indication.

23. The apparatus of claim 22, wherein said indication is a textual display.

24. The apparatus of claim 22, wherein said indication is a graphical display.

25. The apparatus of claim 21, wherein said indication is an audio signal.

26. The apparatus of claim 20, wherein the document copier is a photocopier and said detection device comprises a device for detecting whether a platen cover has been lifted and then lowered.

27. The apparatus of claim 20, wherein said detection device causes the document copier to rescan one or more times to determine whether the document is still present in the document copier.

28. The apparatus of claim 20, wherein the document copier is a facsimile machine.

29. An apparatus for preventing original documents from being left in a document copier, comprising:
a detection device for determining, prior to production of any copies of the document by the document copier, whether the document has been removed from the document copier;
a processor for examining a stored image of the document to determine whether the document includes selected information; and
a control device, responsive to said detection device, for causing the document copier to withhold producing any copies of the document unless the detection device has determined that the document has been removed from the document copier.

30. The apparatus of claim 29, wherein said processor comprises character recognition analysis capability to examine the stored image to determine whether certain key words are on the document.

31. The apparatus of claim 29, further comprising a signaling device for producing an indication to a user of the document copier that scanning the document is complete.

32. The apparatus of claim 31, wherein said indication is a visual indication.

33. The apparatus of claim 32, wherein said indication is a textual display.

34. The apparatus of claim 32, wherein said indication is a graphical display.

35. The apparatus of claim 31, wherein said indication is an audio signal.

36. The apparatus of claim 29, wherein the document copier is a photocopier and said detection device comprises a device for detecting whether a platen cover has been lifted and then lowered.

37. The apparatus of claim 29, wherein said detection device causes the document copier to rescan one or more times to determine whether the document is still present in the document copier.

38. The apparatus of claim 29, wherein the document copier is a facsimile machine.

* * * * *